United States Patent
Min et al.

(10) Patent No.: US 9,229,651 B2
(45) Date of Patent: Jan. 5, 2016

(54) METHOD AND APPARATUS FOR MANAGING MEMORY IN VIRTUAL MACHINE ENVIRONMENT

(71) Applicants: Samsung Electronics Co., Ltd., Gyeonggi-do (KR); Sungkyunkwan University Foundation for Corporate Collaboration, Gyeonggi-do (KR)

(72) Inventors: Changwoo Min, Seoul (KR); Inhyeok Kim, Seoul (KR); Taehyoung Kim, Gyeonggi-do (KR); Young Ik Eom, Seoul (KR)

(73) Assignees: Samsung Electronics Co., Ltd (KR); Sungkyunkwan University Foundation for Corporate Collaboration (KR)

( * ) Notice: Subject to any disclaimer, the term of this patent is extended or adjusted under 35 U.S.C. 154(b) by 194 days.

(21) Appl. No.: 13/775,955

(22) Filed: Feb. 25, 2013

(65) Prior Publication Data

US 2014/0173227 A1  Jun. 19, 2014

(30) Foreign Application Priority Data

Dec. 17, 2012  (KR) .................. 10-2012-0147693

(51) Int. Cl.

| | |
|---|---|
| G06F 12/00 | (2006.01) |
| G06F 3/06 | (2006.01) |
| G06F 12/02 | (2006.01) |
| G06F 12/08 | (2006.01) |
| G06F 9/50 | (2006.01) |
| G06F 9/455 | (2006.01) |

(52) U.S. Cl.
CPC .............. *G06F 3/0644* (2013.01); *G06F 3/061* (2013.01); *G06F 3/0673* (2013.01); *G06F 9/45558* (2013.01); *G06F 9/5016* (2013.01); *G06F 12/023* (2013.01); *G06F 12/08* (2013.01); *G06F 2009/45583* (2013.01); *G06F 2212/151* (2013.01)

(58) Field of Classification Search
CPC ....... G06F 12/08; G06F 12/023; G06F 3/061; G06F 3/0644; G06F 3/0673; G06F 9/45558; G06F 9/501
See application file for complete search history.

(56) References Cited

U.S. PATENT DOCUMENTS

| | | | | |
|---|---|---|---|---|
| 5,010,481 | A * | 4/1991 | Ishida | 711/171 |
| 8,015,383 | B2 | 9/2011 | Shultz et al. | |
| 2006/0036825 | A1 * | 2/2006 | Maki et al. | 711/165 |
| 2009/0006801 | A1 * | 1/2009 | Shultz et al. | 711/170 |
| 2012/0117299 | A1 * | 5/2012 | Waldspurger et al. | 711/6 |
| 2012/0221765 | A1 * | 8/2012 | Yoo et al. | 711/6 |

FOREIGN PATENT DOCUMENTS

| | | |
|---|---|---|
| KR | 1020070049885 | 5/2007 |
| KR | 1020090122936 | 12/2009 |

* cited by examiner

*Primary Examiner* — Aracelis Ruiz
(74) *Attorney, Agent, or Firm* — The Farrell Law Firm, P.C.

(57) ABSTRACT

A method and apparatus for managing a memory in a portable terminal including a main memory, a secondary memory, and a plurality virtual machines allocated by partitioning the main memory are provided. The method includes generating, by the virtual machines, monitoring information by monitoring access to the main memory and the secondary memory and swapping out with respect to the secondary memory; determining memory allocation amounts for each of the virtual machines by using the monitoring information; and allocating the main memory to the virtual machines in a partitioning scheme based on the determined memory allocation amounts.

17 Claims, 9 Drawing Sheets

FIG. 7

Algorithm 1: Calculating the distance

Input: weighted red-black tree $T$, node $n$
Output: distance $d$
begin
    $d \leftarrow$ weight of $n$'s left subtree +1
    $p \leftarrow$ parent node of $n$
    while $p$ *is not nil* do
        if $n$ *is in the right subtree of* $p$ then
            $d \leftarrow d+$ weight of $p$'s left subtree +1
        end
        $p \leftarrow$ parent node of $p$
    end
end

FIG. 8

Algorithm 2: QoS aware lookahead algorithm

Input: $L_i$, LRU histogram of each VM
Output: $A_i$, memory allocation size of each VM
begin
    $A_i \leftarrow M_i$ for each VM $i$
    $R \leftarrow T - \sum_{i=1}^{N} M_i$
    while $R$ do
        foreach VM $i$ do
            $\Delta_i \leftarrow w_i \cdot \text{get\_max\_delta}(i,R)$
            $B_i \leftarrow$ min memory to get $\Delta_i$ for $i$
        end
        $s \leftarrow$ VM with maximum value of $\Delta$
        $A_i \leftarrow A_i + B_s$
        $R \leftarrow R - B_s$
    end
end get_max_delta$(i,R)$:
begin
    $\Delta \leftarrow 0$
    for $j \leftarrow 1$ to $R$ do
        $\delta \leftarrow \left( \sum_{k=A_i}^{A_i+j} L_i[k] \right) / j$
        if $\delta > \Delta$ then $\Delta \leftarrow \delta$
    end
    return $\Delta$
end

METHOD AND APPARATUS FOR MANAGING MEMORY IN VIRTUAL MACHINE ENVIRONMENT

PRIORITY

This application claims priority under 35 U.S.C. §119(a) to Korean Application Serial No. 10-2012-0147693, which was filed in the Korean Intellectual Property Office on Dec. 17, 2012, the entire content of which is incorporated herein by reference.

BACKGROUND OF THE INVENTION

1. Field of the Invention

The present invention relates generally to memory management, and more particularly, to a method of managing a memory in a computing environment in which a plurality of virtual machines is performed in a physical machine, and an apparatus thereof.

2. Description of the Related Art

A virtual machine monitor (also referred to as a hypervisor, or manager) is software for performing a plurality of virtual machines (also called guest operating systems) in one physical machine (e.g., a device including a Central Processing Unit (CPU) and memory), and provides an independent virtual machine interface to respective virtual machines. The virtual machine monitor serves as a host operating system, whereas the virtual machine itself serves as a guest operating system. A virtualization technology using the virtual machine monitor is generally known in a server environment. In recent years, the virtualization technology has been used for the purpose of security in a mobile environment.

The virtual machine monitor causes virtual machines to separately use one physical machine according to a time-sharing scheme. A virtual machine to which a logically independent "virtual machine interface" is allocated recognizes a time-shared physical machine as a logic device to perform its functions. The virtual machine monitor may have performance isolation and Quality of Service (QoS) according to the time-sharing scheme. More specifically, a CPU and an Input/Output (I/O) interface may be shared by virtual machines according to the time-sharing scheme.

However, it is more difficult to efficiently share memory with virtual machines according to the time-sharing scheme than it is to efficiently share the CPU and the I/O interface. Accordingly, a fixed size of memory is allocated to the virtual machine monitor for each virtual machine. In the following example, there are 4 GB of Random Access Memory (RAM) and two virtual machines. The virtual machine monitor may allocate 2 GB of RAM to each virtual machine. However, a static memory partitioning scheme has following problems.

The performance of the CPU or the I/O interface has significantly been developed, whereas the size of a memory mounted in one physical machine is still restrictive. Accordingly, when using a static memory partitioning policy, the number of virtual machines capable of being simultaneously performed in the physical machine is determined according to the size of the memory.

Due to the problems with the static memory partitioning scheme, there is a need for a new memory partitioning scheme. An operating system uses an unused space in the main memory as a page cache, that is, a cache memory to reduce access of a secondary memory (e.g., NAND flash memory, hard disk) to the utmost. Accordingly, there is a need to dynamically allocate the memory to virtual machines in order to improve the performance of a system (e.g., a smart phone having a physical machine and virtual machines).

SUMMARY OF THE INVENTION

The present invention has been made to address the above-described problems and provide at least the advantages described below. An aspect of the present invention provides a method of managing a memory in a computing environment in which a plurality of virtual machines are performed in a physical machine capable of improving performance of a system by dynamically allocating a memory to the virtual machines, and an apparatus thereof.

In accordance with an aspect of the present invention, a method of managing a memory in a portable terminal including a main memory, a secondary memory, and a plurality virtual machines allocated to the main memory by partitioning the main memory is provided. The method includes generating, by the virtual machines, monitoring information by monitoring access to the main memory and the secondary memory and swapping out with respect to the secondary memory; determining memory allocation amounts for each of the virtual machines by using the monitoring information; and allocating the main memory to the virtual machines in a partitioning scheme based on the determined memory allocation amounts.

In accordance with another aspect of the present invention, a portable terminal is provided. The portable terminal includes a secondary memory; a secondary memory; a main memory for storing virtual machines and a virtual machine monitor loaded from the secondary memory; and a controller for accessing the main memory to interpret commands of the virtual machines and the virtual machine monitor, and executing a function according to a result of the interpretation, wherein the virtual machine monitor generates monitoring information by monitoring access to the main memory and the secondary memory and swapping out with respect the secondary memory by the virtual machines, determines memory allocation amounts for each of the virtual machines using the monitoring information, and partitions the main memory to the virtual machines based on the determined memory allocation amounts.

BRIEF DESCRIPTION OF THE DRAWINGS

The objects, features and advantages of the present invention will be more apparent from the following detailed description in conjunction with the accompanying drawings, in which:

FIG. 7 is a diagram illustrating a location computing algorithm according to an embodiment of the present invention;

FIG. 8 is a diagram illustrating a memory allocation amount determining algorithm according to an embodiment of the present invention.

DETAILED DESCRIPTION OF EMBODIMENTS OF THE PRESENT INVENTION

Embodiments of the present invention are described as follows with reference to the accompanying drawings in detail. The same or similar reference numbers may be used throughout the drawings to refer to the same or like parts. Detailed descriptions of well-known functions and structures incorporated herein may be omitted in order to avoid obscuring the subject matter of the present invention.

A method and an apparatus for managing a memory according to embodiments of the present invention are applied to a system such as a server and a Personal Computer (PC). In particular, embodiments of the present invention may be applied to a portable terminal such as a smart phone, a tablet PC, and a notebook PC.

A method and the apparatus for managing a memory according to an embodiment of the present invention periodically monitor an amount of a memory, i.e., a working set necessary for respective virtual machines, determine amounts of the memory to be allocated to the virtual machines using monitoring information, and partition the memory based on the determined allocation amounts to allocate the partitioned memories to the virtual machines. Upon using a scheme according to embodiments of the present invention, a given memory is dynamically and efficiently partitioned to the virtual machines so that the performance of the system may be maximized and a plurality of virtual machines may be operated in one physical machine.

Hereinafter, a method and the apparatus for managing a memory according to an embodiment of the present invention are described in detail.

Figure 1:
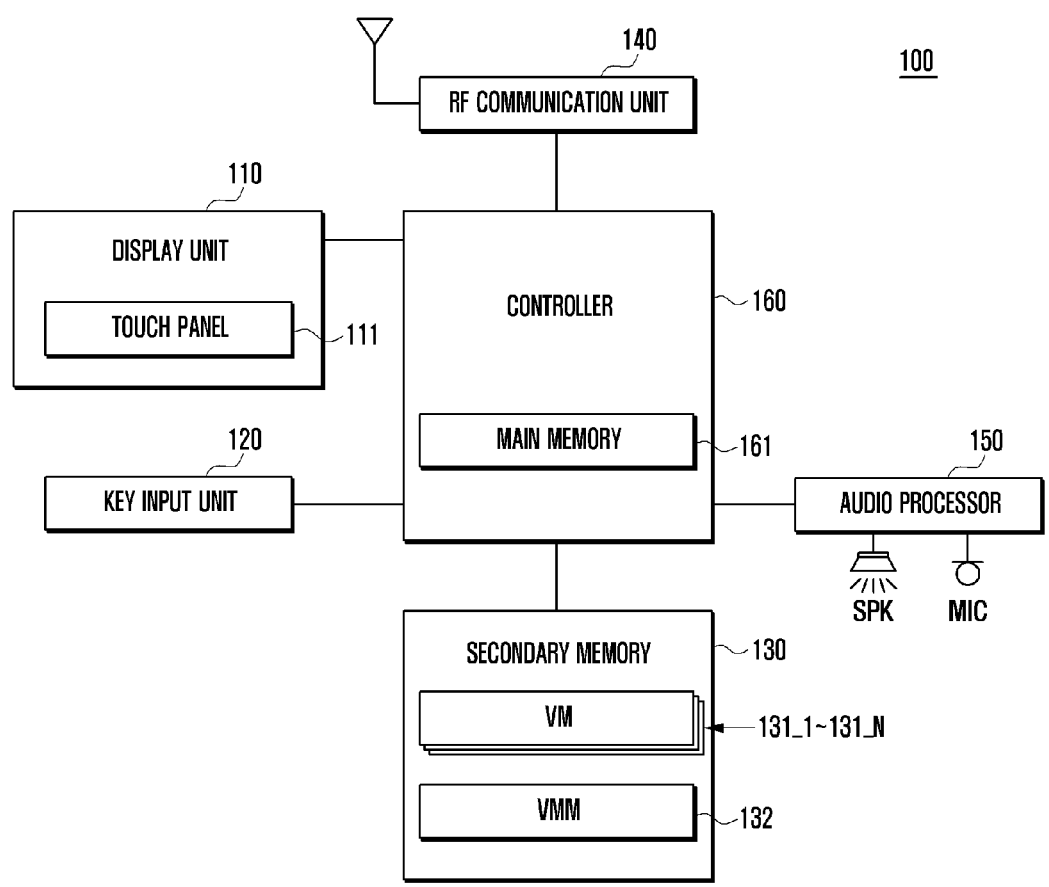
FIG. 1 is a block diagram illustrating a configuration of a portable terminal according to an embodiment of the present invention.

FIG. 1 is a block diagram illustrating a configuration of a portable terminal according to an embodiment of the present invention.

Referring to FIG. 1, a portable terminal 100 according to an embodiment of the present invention includes a display unit 110, a key input unit 120, a secondary memory 130, a Radio Frequency (RF) unit 140, an audio processor 150, a speaker SPK, a microphone MIC, a controller 160, and a main memory 161.

The display unit 110 displays an image on a screen under control of the controller 160. More specifically, when the controller 160 processes (e.g., decodes) data to an image to be displayed on the screen and stores the processed image in a buffer, the display unit 110 converts an image stored in the buffer into an analog signal and displays the converted analog signal on a screen. When power is supplied to the display unit 110, the display unit 110 displays a lock image on the screen. If lock release information (i.e., a password) is detected in a state in which the lock image is displayed, the controller 160 releases lock. More specifically, the display unit 110 displays an image other than the lock image under the control of the controller 160. The lock release information is text information (e.g., "1234") that a user inputs into the portable terminal 100 using a key pad or a key input unit 120 displayed on a screen, track of touch of the user with respect to the display unit 110, a direction or a type of the touch, or voice data of the user inputted to the portable terminal through a microphone. Meanwhile, other images displayed by the display unit 110 include a home image, an application execution image, a key pad, a menu, etc. The home image includes a background image and a plurality of icons displayed on top of the background image. Icons indicate applications or contents (e.g., photograph file, video file, record file, document, message, etc.). If the user selects one application or content item, such an application icon from icons (e.g., by tapping an icon), the controller 160 executes a corresponding application (e.g., an application providing a Social Network Service (SNS)), and controls the display unit 110 to display an execution image. The display unit 110 may display one execution image, such as an application execution image from the images as a background, and display another image, for example, a key pad as a foreground to overlap with the background under the control of the controller 160. The display unit 110 displays a first image on a first region and a second image on a second region under the control of the controller 160. The display unit 110 may be include a Liquid Crystal Display (LCD), an Organic Light Emitted Diode (OLED), an Active Matrix Organic Light Emitted Diode (AMOLED), a Flexible display, etc.

A touch panel 111 is placed on the display unit 110. In detail, the touch panel 111 may be, for example, either an add-on type that is located at a screen of the display unit 110 or an on-cell type or an in-cell type that is inserted into the display unit 110.

The touch panel 111 generates an analog signal (e.g., a touch event) in response to a user gesture with respect to the touch panel 111, converts the analog signal into a digital signal, and transfers the digital signal to the controller 160. The touch event includes touch coordinates (e.g., x, y coordinates). When the touch coordinates are received from the touch panel 111, the controller 160 determines that a touch tool (e.g., finger or pen) is touched on the touch panel 111. When the touch coordinates are not received from the touch panel 111, the controller 160 determines that the touch is released. For example, when the touch coordinates are changed from $(x_1, y_1)$ to $(x_2, y_2)$, the controller 160 determines that the touch is moved. The controller 160 computes location change amounts (dx, dy) and motion speed of the touch in response to the motion of the touch. The controller 160 determines the user gesture (such as one of touch and tap, double tap, long tap, tap & touch, drag, flick, press, pinch in, and pinch out) based on touch coordinates, presence of release of the touch, presence of motion of the touch, the location change amount and motion speed of the touch. The touch panel 111 may be an integrated touch panel including a hand touch panel detecting a hand gesture and a pen touch panel detecting a pen gesture. The hand touch panel is may be a capacitive type, a resistive type, an infrared type, an ultrasonic type panel, etc. The hand touch panel generates a touch event not only by a hand gesture of the user but also by other objects (e.g., a conductive material with varying capacitance). The pen touch panel may be an electromagnetic induction type panel. Accordingly, the pen touch panel generates the touch event by a specially manufactured touch stylus pen that forms a magnetic field.

The key input unit 120 may include a plurality of input keys and function keys for receiving numeric or character information and setting various functions. The keys may include, for example, a menu loading key, a screen on/off key, a power on/off key, and a volume control key. The key input unit 120 generates a key event associated with user setting and function control of the portable terminal 100 and transfers the key event to the controller 160. The key event may include, for example, a power on/off event, a volume control event, a screen on/off event, and a shutter event. The controller 160 controls the foregoing constituent elements in response to the key event. Meanwhile, a key of the key input unit 120 may be a hard key, a virtual key displayed on the display unit 110, and/or a soft key.

The secondary memory 130 includes a disk, a Random Access Memory (RAM), a Read-Only Memory (ROM), and a flash memory. The secondary memory 130 stores a booting program, a plurality virtual machines 131_1 to 131_N (i.e., guest operating systems), a virtual machine monitor 132 (i.e., a host operating system), and a plurality of applications. The virtual machines 131_1 to 131_N operate based on the virtual machine monitor 132. The virtual machines 131_1 to 131_N serve as an interface between hardware and an application and as an interface between applications, and also manage a computer resource such as a CPU, a Graphics Processing Unit (GPU), the main memory 161, and the secondary memory 130. The applications are classified into embedded applications and third party applications. For example, the embedded applications may include, for example, a web browser, an e-mail program, and an instant messenger. When battery power is supplied to the controller 160 of the portable terminal 100, the booting program is loaded into a main memory of the controller 160. The booting program loads host and guest operating systems into the main memory 161. The operating systems load the application into the main memory 161. The loading of the application is generally known in the art, thus a detailed description thereof is omitted.

The RF communication unit 140 performs voice calls, image calls, and/or data communication with an external device through a network under the control of the controller 160. The RF communication unit 140 may include an RF transmitter for up-converting a frequency of a transmitted signal and amplifying the converted signal, and an RF receiver for low-noise-amplifying a frequency of a received signal and down-converting the amplified signal. The RF communication unit 140 may include a mobile communication module (e.g., a $3^{rd}$-generation mobile communication module, a 3.5-generation mobile communication module, a $4^{th}$-generation mobile communication module, etc.), a digital broadcasting module (e.g., a Digital Multimedia Broadcasting (DMB) module), and a near field communication module.

The audio processor 150 inputs and outputs audio signals (e.g., voice data) for voice recognition, voice recording, digital recording, and calls. The audio processor 150 receives an audio signal from the controller 160, converts the received audio signal into an analog signal, amplifies the analog signal, and outputs the amplified analog signal through the speaker SPK. The audio processor 150 converts an audio signal received from the microphone MIC into a digital data, and provides the converted digital signal to the controller 160. The speaker SPK converts an audio signal received from the audio processor 150 into a sound wave and outputs the sound wave. The MIC converts the sound wave from a person or other sound provides input into the audio signal.

The controller 160 controls an overall operation and signal flow between internal constituent elements of the portable terminal 100, processes data, and controls supply of power from a battery to the constituent elements. The controller 160 includes a CPU and a GPU. The CPU is a core control unit of a computer system performing computation and comparison of data, and interpretation and execution of a command. The CPU is a graphic control unit performing computation and comparison of data associated with graphics, and interpretation and execution of a command. Each of the CPU and the GPU may integrate more than one independent core (e.g., a quad-core package) as one package being a single Integrated Circuit (IC). The CPU and the GPU may be a System on Chip (SoC). The CPU and the GPU may be a package of a multi-layer structure. A configuration including the CPU and the GPU may refer to an Application Processor (AP).

The controller 160 communicates with the main memory 161. The main memory 161 may store various programs, for example, a booting program, a host operation system, guest operating systems, and applications loaded from the secondary memory 130. More specifically, the controller 161 accesses the foregoing program to decode commands of the program and execute functions according to the interpretation results. In particular, at least one CPU executes a function of the virtual machine monitor 220. The main memory 161 temporarily stores data to be written in the secondary memory 130 and temporarily stored data read out from the secondary memory 130. A cache memory may be further provided as a temporary data warehouse.

Since the structural elements can be variously changed according to convergence trend of a digital devices, and therefore, other configurations may be used in accordance with embodiments of the present invention. The portable terminal 100 may also include constructions that are not mentioned above, such as a GPS module, a vibration motor, an accessory, and an external device interface (e.g., ear jack). For example, the accessory may be a pen for touching a touch screen as an accessory of the portable terminal 100 movable from the portable terminal 100. In the portable terminal 100 according to an embodiment of the present invention, specific constituent elements may be excluded from the foregoing constructions or be substituted by other constituent elements according to the provided form.

Figure 2:
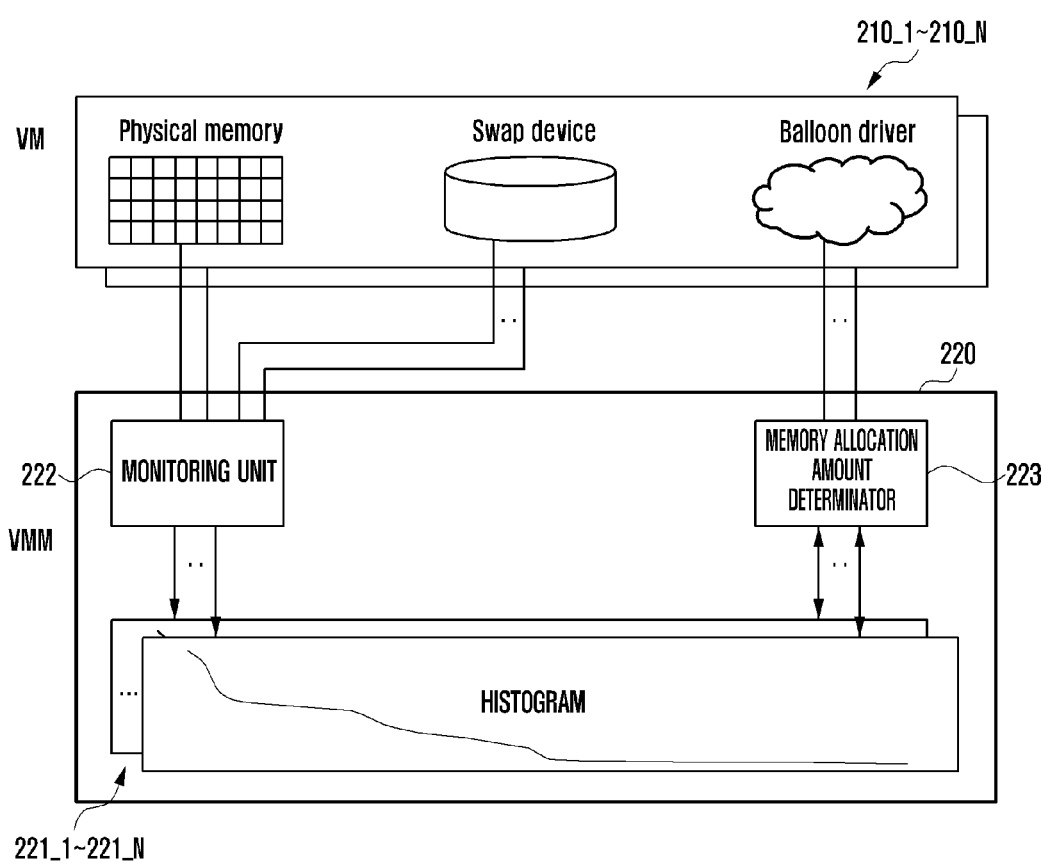
FIG. 2 is a block diagram illustrating a virtual machine and a virtual machine monitor according to an embodiment of the present invention.

FIG. 2 is a block diagram illustrating a virtual machine and a virtual machine monitor according to an embodiment of the present invention.

Referring to FIG. 2, a main memory 161 stores a plurality of virtual machines 210_1 to 210_N and a virtual machine monitor 220. The controller 160 accesses the main controller 161 to interpret commands of the virtual machines 210_1 to 210_N and the virtual machine monitor 220, and executes a function according to the interpretation result. According to a hierarchical structure, the virtual machine monitor 200 is provided above physical machines (e.g., a CPU, a GPU, the main memory 161, and the secondary memory 130), and the virtual machines 210_1 to 210_N are provided above the virtual machine monitor 200.

As described above, the virtual machine monitor 200 causes the virtual machines 210_1 to 210_N to partition the CPU and the GPU using the time sharing scheme. The virtual machine monitor 220 may cause the virtual machines 210_1 to 210_N to partition the main memory 161 using a dynamic allocation scheme.

The virtual machines 210_1 to 210_N use memory areas partitioned thereto to execute applications and to temporarily store data, respectively. Each of the virtual machines 210_1 to 210_N includes a swap unit and a balloon driver. When a memory amount allocated to its virtual machine is less than a required memory amount, the swap unit performs a swap out. When a memory amount allocated to its virtual machine is more than a required memory amount, the swap unit performs a swap in. The swap out is an operation of writing an application or data in the secondary memory 130 when an allocated amount of the main memory 161 is short. For example, when there is an application having a capacity of 1.1 GB and the memory amount allocated to a virtual machine is 1 GB, 1 GB is recorded in the main memory 161 and a remaining 0.1 GB is recorded in the secondary memory 130 by the swap device. The swap in is an operation of transferring the application or data recorded in the secondary memory 130 to the main memory 161. The swapping performed by the swap device is controlled by a balloon driver. The balloon driver changes a memory amount allocated to the virtual machine under control of the virtual machine monitor 220. A method of changing the allocation amount according to an embodiment of the present invention is described herein below. When the allocation amount is reduced from 1.1 GB to 1 GB, the balloon driver sets a region corresponding to 0.1 GB as a swapping pinned kernel memory. The term "pinned" refers to fixing a corresponding region by a pin. That is, a corresponding virtual machine cannot use a region set as a kernel memory, but other virtual machines can use the region. When the allocation amount is increased from 1 GB to 1.1 GB, the balloon driver releases the setting. Accordingly, the corresponding virtual machine may again use 0.1 GB.

The virtual machine monitor 220 manages Least Recently Used (LRU) histograms 221_1 to 221_N by virtual machines 210_1 to 210_N.

A monitoring unit 222 of the virtual machine monitor 220 monitors (detects) page access. The page access is an operation of reading out information from a page by a virtual machine or a virtual machine monitor. The accessed page is a page of the main memory 161 or a page of the secondary memory 130. The monitoring unit 222 monitors access of the main memory 161 and access of the secondary memory 130, and monitors swap out of the swap device. A page fault scheme is used to monitor the access of the main memory 161. The virtual machine monitor 220 sets an access flag of a page being a target of monitoring to OFF. If the virtual machine accesses a corresponding page, an event indicating page fault is generated. The virtual machine monitor 220 determines that the generation of the event is a "page access". Such schemes may be used for both of shadow paging and nest paging. Meanwhile, the access of the swap device to the secondary memory 130 refers to guest swapping. The monitoring unit 222 monitors the guest swapping. Swap out of the swap device refers to virtual machine (VM)-level swapping. The monitoring unit 222 monitors the VM-level swapping. Meanwhile, the virtual machine monitor 220 may directly perform the swapping. For example, the virtual machine sends a request for additional partitioning of the memory to the virtual machine monitor 220. In response to this request, the virtual machine monitor 220 further partitions the main memory 161 to a corresponding virtual machine. However, when there is no memory available to be partitioned, the virtual machine monitor 220 directly performs swapping. Such a swapping refers to Virtual Machine Monitor (VMM)-level swapping. The monitoring unit 222 monitors the VMM-level swapping.

The monitoring unit 222 calculates a reuse distance of an accessed page, and accumulates the calculated reuse distance to update the LRU histogram. The page is a unit for configuring the memory. For example, the memory may be classified in page units of 2 KB or 4 KB. The monitoring unit 222 manages page lists by virtual machines. More specifically, the monitoring unit 222 reads out from a page list from a memory (e.g., main memory 161 or secondary memory 130). A total order of the page list corresponds to an amount of the main memory 161 allocated to a corresponding virtual machine. For example, when the allocation amount is 200 KB and a unit of a page is 1 KB, a total order of the page list is 0~199. The monitoring unit 222 determines whether information of an accessed page of the main memory 161 is included in the page list. When the information of an accessed page of the main memory 161 is included in the page list, the monitoring unit 222 moves corresponding page information to the head of the page list to update the page list. For example, the virtual machine monitor 220 changes an order of the page to an order (e.g., 0) indicating a first location. The change amount (e.g., a difference is '50' when an order before update is 500 and an order after the update is 0) is the foregoing reuse distance.

The monitoring unit 222 calculates a movement distance of the page information (i.e., calculates in which part of the page list the page information is located). The monitoring unit 222 divides a total accumulation amount of the reuse distance by a required amount (i.e., an amount of a memory required for a corresponding virtual machine) to obtain a page miss rate. That is, $$\text{Page miss rate} = \frac{\text{required amount} - \text{allocation amount}}{\text{required amount}}.$$

For example, when a current required amount for the virtual machine is 1.1 GB and the allocation amount is 1 GB, the page miss rate=1.1−1)/1.1, i.e., the page miss rate is 9%. The Miss Rate Curve (MRC) indicates a graph of a page miss rate according to the allocation amount of the memory.

Figure 3:
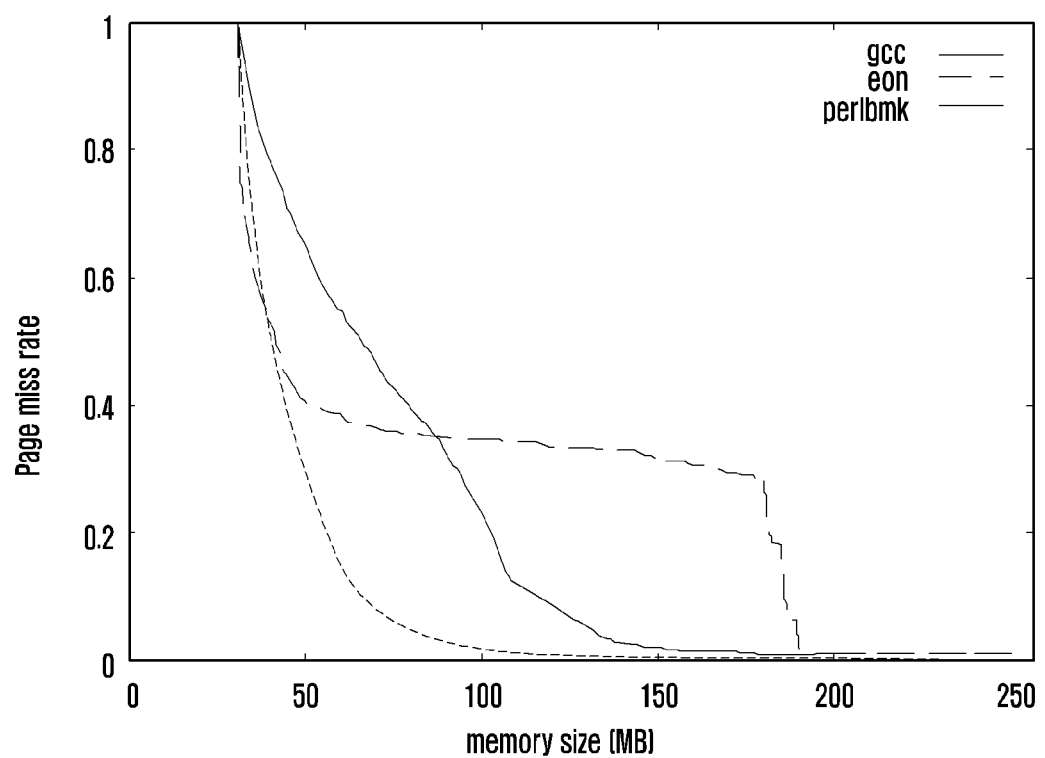
FIG. 3 is a graph illustrating a Miss Rate Curve (MRC) according to an embodiment of the present invention.

FIG. 3 is a graph illustrating an MRC according to an embodiment of the present invention.

Referring to FIG. 3, when 100 MB is allocated to a first virtual machine executing an application Gnu's Not Unix! (GNU) Compiler Collection (gcc), a second virtual machine executing an application eon, and a third virtual machine executing an application perlbmk, a page miss is scarcely generated in the first virtual machine. A page miss rate of the first virtual machine is estimated as 30% and a page miss rate of the second virtual machine is estimated as 40%. The virtual machine monitor 220 determines an allocation amount of the memory using the estimation result, and transfers the determined allocation amount of the memory to a corresponding virtual machine.

A memory allocation amount determinator 223 of the virtual machine monitor 220 estimates page miss rates with respect to virtual machines using the LRU histograms, and determines allocation amounts of the memory with respect to the virtual machines using the estimated page miss rates. The memory allocation amount determinator 223 transmits memory allocation amount information to balloon drivers.

Figure 4:
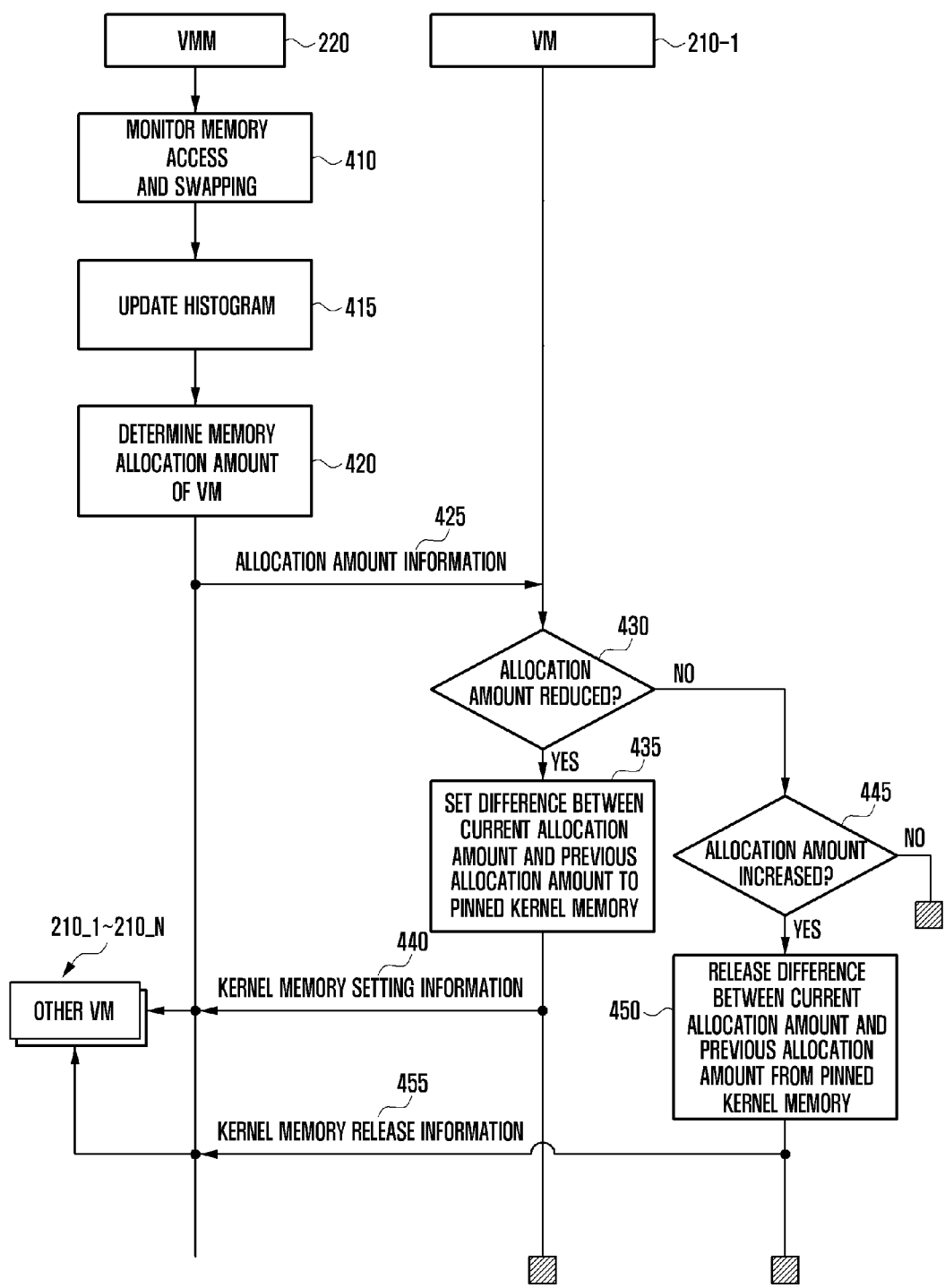
FIG. 4 is a flowchart illustrating a method of managing a memory according to an embodiment of the present invention.

FIG. 4 is a flowchart illustrating a method of managing a memory according to an embodiment of the present invention.

Referring to FIG. 4, a virtual machine monitor 220 monitors (detects) memory access of a virtual machine, for example, a first virtual machine 210_1, in step 410. In detail, the monitoring unit 222 monitors access of a main memory 161, access of a secondary memory 130, and swap out of a swap device. The monitoring unit 222 of the virtual machine monitor 220 calculates a reuse distance of an accessed page, and accumulates the calculated reuse distance to update an LRU histogram, in step 415. A method of calculating the reuse distance is described herein above.

A memory allocation amount determinator 223 of the virtual machine monitor 220 determines a memory allocation amount of the first virtual memory 210_1 using the LRU histogram, in step 420.

The memory allocation amount determinator 223 of the virtual machine monitor 220 transmits allocation amount information to the first virtual memory 210_1, in step 425.

The balloon driver of the first virtual machine 210_1 determines whether an amount allocated to the first virtual machine 210_1 is reduced using the received allocation amount information, in step 430. When the allocation amount is reduced, the balloon driver of the first virtual machine 210_1 sets a difference between a current allocation amount and a previous allocation amount to a pinned kernel memory, in step 435. Next, the balloon driver of the first virtual machine 210_1 transmits kernel memory setting information to the virtual machine monitor 220, in step 440. Accordingly, the virtual machine monitor 220 determines a virtual machine that will use the kernel memory among other virtual machines 210_2 to 210_N, and transfers kernel memory setting information to the determined virtual machine.

The balloon driver of the first virtual machine 210_1 determines whether the amount of memory allocated to the first virtual machine 210_1 is increased by using the received allocation amount information, in step 445. When the allocation amount is increased, the balloon driver of the first virtual machine 210_1 releases a difference between the current allocation amount and the previous allocation amount from the pinned kernel memory, in step 450. Next, the balloon driver of the first virtual machine 210_1 transmits kernel memory release information to the virtual machine monitor 220, in step 455. Accordingly, the virtual machine monitor 220 transmits the kernel memory release information to other virtual machines using a memory area corresponding to the kernel memory release information, so that the virtual machine monitor 220 does not use a corresponding area any longer.

Figure 5:
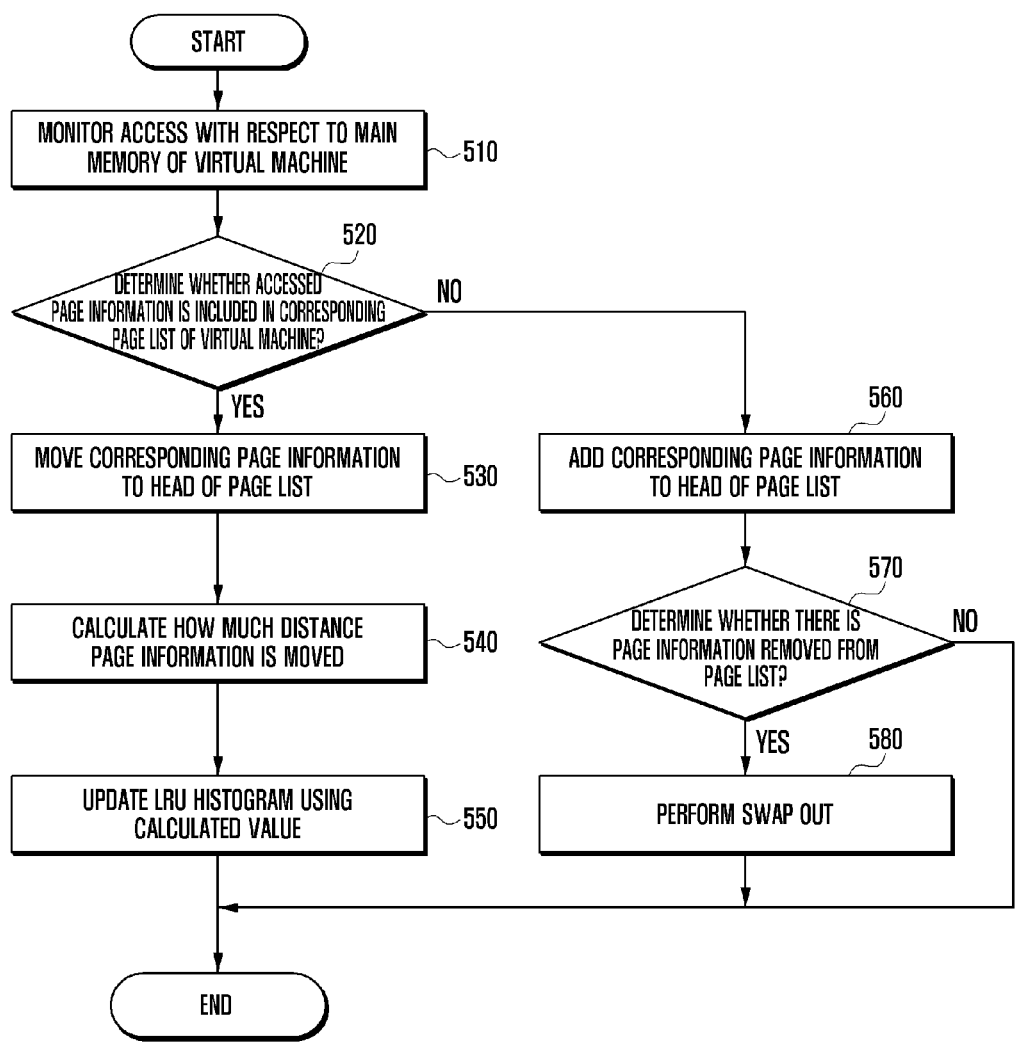
FIG. 5 is a flowchart illustrating a Least Recently Used (LRU) histogram update method according to an embodiment of the present invention.
Figure 6:
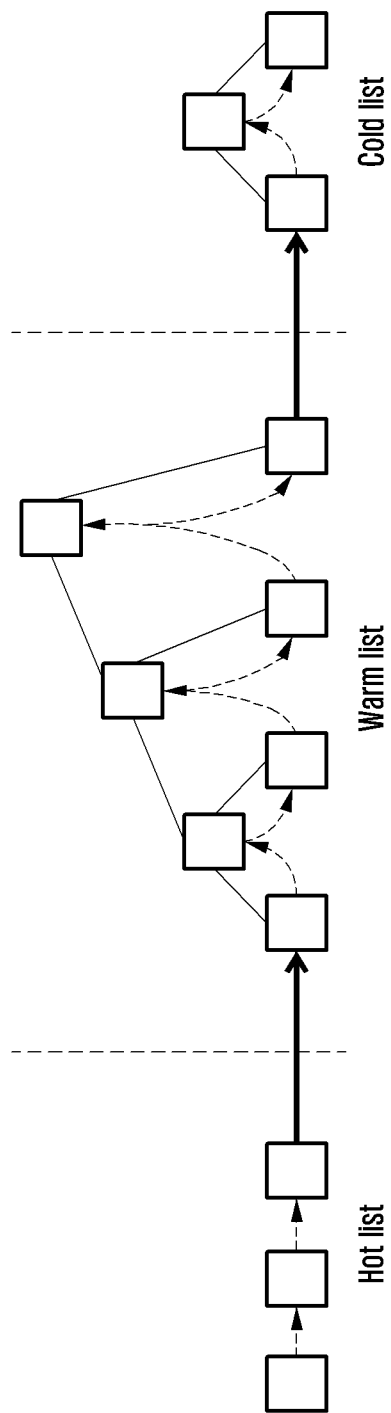
FIG. 6 is a diagram illustrating a structure of a page list according to an embodiment of the present invention.

FIG. 5 is a flowchart illustrating a least recently used histogram update method according to an embodiment of the present invention. FIG. 6 is a diagram illustrating a structure of a page list according to an embodiment of the present invention. FIG. 7 is a diagram illustrating a location computing algorithm according to an embodiment of the present invention.

Referring to FIG. 5, a monitoring unit 222 of a virtual machine monitor 220 monitors (i.e., detects) access with respect to a main memory 161 of a virtual machine, in step 510.

The monitoring unit 222 determines whether information about an accessed page is included in a corresponding page list of the virtual machine, in step 520. When the information about an accessed page is included in the corresponding page list of the virtual machine, the process goes to step 530. The monitor unit 222 moves corresponding page information to the head of a page list, in step 530. The monitoring unit 222 calculates how the distance that the page information has moved (i.e., calculates in which part of the page list the page information is located), in step 540. A method of calculating the location according to an embodiment of the present invention is described herein below. The monitoring unit 222 updates the LRU histogram using the calculated value, in step 550.

When the information about an accessed page is not included in the corresponding page list of the virtual machine, the process goes to step 560. The monitoring unit 222 adds corresponding page information to the head of the page list, in step 560. Next, the monitoring unit 222 determines whether page information has been removed from the page list, in step 570. When existing page information that has been removed from the page list as new page information is added to the page list, the monitoring unit 222 of the virtual machine monitor 220 transfers the removed page information to the virtual machine, in step 580. Accordingly, the virtual machine performs the swap out, in step 580.

Referring to FIG. 6, the page list may be classified into one of a hot list, a warm list, and a cold list according an access order. For example, when a total order of the page list is from 0 to 199, a list corresponding to 0 to 50 is classified as a hot list, a list corresponding to 51 to 150 is classified as a warm list, and a list corresponding to 151 to 199 is classified as a cold list. When the new page information is added to the head of the hot list, page information arranged at the end of the hot list is moved to the head of the warm list, page information arranged at the end of the warm list is moved to the head of the cold list, and page information arranged at the end of the cold list is removed from the cold list. As described above, the hot list is a list associated with the latest accessed pages, the warm list is a list associated with accessed pages prior to the pages of the hot list, and the cold list is a list associated with accessed pages prior to the pages of the warm list. When the page information is removed from the cold list, an allocation amount of a corresponding virtual machine has been exceeded. In this case, the virtual machine monitor 220 performs the VMM-level swapping.

If monitoring access of all pages of a virtual machine to generate an LRU histogram, overhead is too large. Embodiments of the present invention reduce the overhead using the following two schemes. In the first scheme, the monitoring unit 222 does not monitor access of hot pages corresponding to the hot list, but instead monitors only access of warm pages corresponding to the warm list and cold pages corresponding to the cold list.

Regarding the second scheme, it takes a long time to calculate which part of the page list the page is located. In particular, since a calculation time is increased in proportion to the number N of pages if total pages are configured by a list, there is time complexity of the number N of pages. Accordingly, in the second, scheme, the virtual machine monitor 210 manages the warm pages and the cold pages as a weighted red-black tree. In general, a red-black tree satisfies following five conditions. The red-black tree is generally known in a data structure field, and thus a detailed description thereof is omitted.

1. All nodes are red or black.
2. A root node is black.
3. Leaf nodes are black.
4. All children of the red node are black. However, children of the black node are not limited to red.
5. The numbers of black nodes between all the leaf nodes are the same in the root node.

Referring to FIGS. 6 and 7, page information added to the weighted red-black tree is inserted into a left bottom end of a tree, and a page evicted from the weighted red-black tree is removed from a right bottom end of the tree. The virtual machine monitor 220 stores the number of child nodes existing in each node of the tree. When a node is added to the tree, the virtual machine monitor 220 increases weights of mother nodes of the added node by 1, respectively. When the node is removed from the tree, the virtual machine monitor 220 reduces weights of mother nodes by 1, respectively. As described above, the weighted red-black tree is obtained by updating and enlarging a weight in all computations of a red-black tree such as insertion, removal, left-rotation, and right-rotation, i.e., location information of a node (that is, page) in the weighted red-black tree is a sum of weights of all child nodes of a corresponding node. The summation is possible by an algorithm shown in FIG. 7. According to the algorithm shown in FIG. 7, the location information may be calculated as time complexity of log N. Performance and scalability are superior as compared with a method of using a page having time complexity of N.

Meanwhile, when the size of the hot list is large, overhead is small, but precision of the LRU histogram is lowered. When the size of the hot list is small, precision is high, but the overhead is increased. Embodiments of the present invention provide a method for increasing precision, while lowering the overhead by dynamically the size of the hot list. Methods according to embodiments of the present invention periodically change the size of the hot list. In the present example, the number of page accesses to be monitored during one period is F, and the number of page access to be monitored at one period ago based on a current period t is $F^{t-1}$. Then, the virtual machine monitor 220 changes the size $H_i$ (i is I-th virtual machine) of the hot list so that the number of page access becomes F during a current period. When the $F^{t-1}$ is greater than the F, because the virtual machine monitor 220 monitors a small number of page access, the virtual machine monitor 220 increases the size of the hot list. When the $F^{t-1}$ is less than the F, the virtual machine monitor 220 reduces the size of the hot list. The virtual machine monitor 220 determines how much the hot list is changed using following Equations (1) and (2).

$$E_i^t = \min\left(\max_{e \in E}(e), A_i\right) \quad (1)$$

$$E = \left\{ e \left| \sum_{j=e}^{T} L_j \cdot \frac{F^{t-1}}{M^{t-1}} \geq F \right. \right\} \quad (2)$$

In Equation (1), $E_i^t$ is an estimated value of the size of the hot list with respect to a period t of an i-th virtual machine, $M^{t-1}$ is a sum with respect to histogram entry of a warm list and a cold list being a monitoring target during a previous period, and e and the $L_j$ are preset constants. The virtual machine monitor 220 calculates the size E of the hot list to monitor page access larger than F based on page access generated with respect to the warm list and the cold list during a previous period. The virtual machine monitor 220 determines the greatest value of the calculated sizes E of the hot list as the estimated value $E_i^t$. Since the size of the hot list may not be greater than a memory allocation amount $A_i$, when the determined value is greater than $A_i$, the virtual machine monitor 220 determines the $A_i$ as the estimated value $E_i^{t-1}$. When the estimated value $E_i^t$ of a period t is different from an estimated value $E_i^{t-1}$ of a period t−1, the virtual machine monitor 220 determines the size $H_i^t$ of the hot list as the estimated value $E_i^t$. When the estimated value $E_i^t$ of a period t is the same as the estimated value $E_i^{t-1}$ of a period t−1, the virtual machine monitor 220 determines the size $H_i^t$ of the hot list using a difference between the F and the $F^{t-1}$. In a following Equation (3), γ is a pre-set constant.

$$H_i^t = H_i^{t-1} \cdot \left(1 + \gamma \cdot \frac{F^{t-1} - F}{F}\right) \quad (3)$$

Hereinafter, step 420, which corresponds to a method of determining a memory allocation amount according to an embodiment of the present invention, is described.

FIG. 8 is a diagram illustrating a memory allocation amount determining algorithm according to an embodiment of the present invention.

Referring to FIG. 8, the virtual matching monitor 220 updates LRU histograms by virtual machines, and again and periodically calculates memory allocation amounts by using virtual machines using the LRU histograms. The virtual machines compete with each other with respect to a limited main memory 161. The virtual machine monitor 220 dynamically partitions the main memory 161 to the virtual machines to maximize the performance of the portable terminal 100, i.e., the virtual machine monitor 220 dynamically partitions the main memory 161 to the virtual machines to minimize a total page miss rate.

QoS may be changed according to virtual machines. Accordingly, QoS may be reflected in memory allocation conditions. According to an embodiment of the present invention, a "QoS aware lookahead algorithm" described herein below may be used to satisfy both total performance and QoS of the system.

Referring to FIG. 8, a minimum memory allocation capacity $M_i$ and relative importance $w_i$ are previously set to set QoS by virtual machines $VM_i$. In the present example, a total memory value that the virtual machine monitor 220 may allocate to the virtual machines is T. First, the virtual machine monitor 220 allocates a minimum allocation amount to the virtual machines. Next, the virtual machine monitor 220 determines a remaining memory capacity R using the T and the $M_i$.

When the remaining memory capacity R is allocated to the i-th virtual machine, the virtual machine monitor 220 calculates the amount by which a page miss rate per unit memory is reduced (get_max_delta(i,R)), and calculates a minimum memory capacity $B_i$ to be allocated to obtain a corresponding miss rate. The virtual machine monitor 220 allocates a minimum memory capacity $B_i$ of a virtual machine having the greatest multiplication of a reduced rate (get_max_delta(i,R)) of a page miss rate per unit page and the relative importance $w_i$. This procedure is repeated until no memory remains, to determine a memory allocation amount by virtual machines. In the present example, the total number of virtual machines is 2, 10 MB is allocated to each virtual machine, a page miss rate of the first virtual machine is 50%, a page miss rate of the second virtual machine is 40%, a current remaining memory capacity is 5 MB, and a page miss rate and a reduced rate per unit memory are as listed in a following Table 1 when 1 MB to 5 MB is further allocated to the first virtual machine and the second virtual machine.

Then, the virtual machine monitor 220 allocates 1 MB to the first virtual machine, allocates 1 MB to the first virtual machine, allocates 1 MB to the second virtual machine, allocates 1 MB to the second virtual machine, and allocates remaining 1 MB to the second virtual machine. Accordingly, the first virtual machine reduces the page miss rate from 50% to 25%, the second virtual machine reduces the page miss rate from 40% to 29%, so that a total reduced rate becomes 36%. If a total of 5 MB is allocated to the first virtual machine, there is a 30% reduction, which is less than the foregoing reduction rate of 36%.

TABLE 1

| | | 0 MB | 1 MB | 2 MB | 3 MB | 4 MB | 5 MB |
|---|---|---|---|---|---|---|---|
| First VM | Page miss rate | 50% | 35% | 25% | 23% | 21% | 20% |
| | Reduced rate | — | 15% | 10% | 2% | 2% | 1% |
| Second VM | Page miss rate | 40% | 34% | 29% | 26% | 26% | 26% |
| | Reduced rate | — | 6% | 5% | 3% | 0 | 0 |

Figure 9:
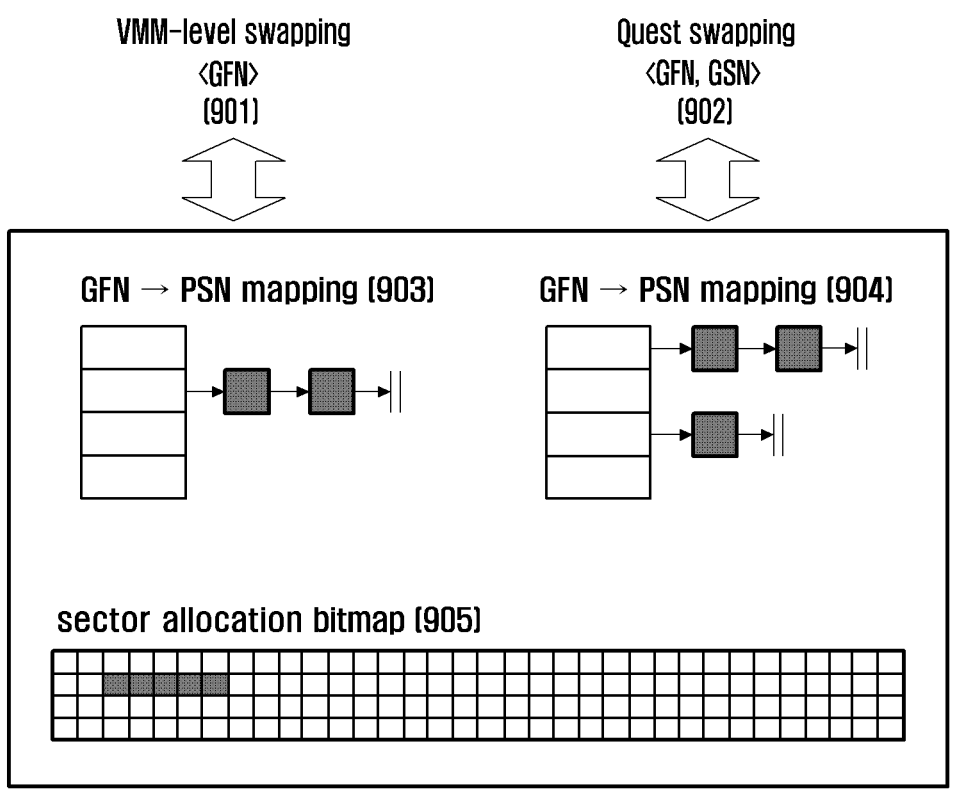
FIG. 9 is a diagram illustrating a dual paging preventing method according to an embodiment of the present invention.

FIG. 9 is a diagram illustrating a dual paging preventing method according to an embodiment of the present invention.

As described above, the swapping includes VM-Level swapping and VMM-Level swapping. The VM-Level swapping and the VMM-Level swapping are complementary with each other. If memory capacity is less than a required amount, the virtual machine performs a swap out. Since this method directly selects a victim page, that is, a reusable page, it is the most efficient. However, before a memory allocation amount of the virtual machine is changed and a balloon driver restores the memory to the virtual machine monitor, VMM-level swapping may be generated. The VMM-level swapping may directly perform swapping without waiting for restoration of the memory. The VM-Level swapping and the VMM-Level swapping are complementary with each other. When VM-Level swapping and VMM-Level swapping are simultaneously used, there is a drawback. If the virtual machine swaps out the swapped out page, swap in is generated in the virtual machine monitor and swap out is then generated in the virtual machine. Accordingly, two unnecessary inputs/outputs are generated. Such a problem refers to dual paging.

Embodiments of the present invention provide a Virtual Swap unit (VSWAP) as illustrated in FIG. 9 to prevent dual paging and to efficiently process the VM-Level swapping and the VMM-Level swapping. The VSWAP controls the VM-Level swapping and the VMM-Level swapping. The VSWAP is stored in the secondary memory 130, and is loaded from the secondary memory 130 to the main memory 161. The controller 160 accesses the main memory 161 to interpret a command of the VSWAP, and performs a function, that is, a dual paging preventing function according to the interpretation result.

Referring to FIG. 9, the VSWAP includes two interfaces, which are a first interface 901 connecting the VSWAP to the virtual machine monitor and a second interface 902 connecting the VSWAP to the virtual machine.

The virtual machine monitor reports a Guest Physical Page Frame Number (GFN) to the VSWAP through the first interface to process the swap out. Then, the VSWAP confirms a sector allocation bitmap 905 to select a Physical Sector Number (PSN), which is not allocated, stores page information corresponding to the GFN in the selected PSN, and stores information associated with mapping of the PSN to the GFN in a first table 903. When the virtual machine monitor requests swap in with respect to the GFN, the VSWAP search the PSN mapped to the requested GFB from the first table 903, and reads information from the searched PSN.

The virtual machine requests the VSWAP to store the GFN for swap out in the GSN, i.e., a request message including the GFN and the GSN is transferred to the VSWAP through the second interface 902. In response to the request message, the VSWAP confirms whether the virtual machine monitor processes swap out with respect to the GFN by searching the first table 903. If the GFN is included in the first table 903, the VSWAP recognizes that the GFN is previously swapped out, searches a PSN corresponding to the GFN, and stores information associated with mapping of the searched PSN to the requested GSN in the second table 904. In this scheme, the VSWAP solves a dual paging problem. If the GFN is not included in the first table 903, the VSWAP confirms a sector allocation bitmap 905 to select a PSN that is not allocated, stores page information corresponding to the GFN in the selected PSN, and stores information associated with mapping of the PSN to the GFN in the second table 904. When the virtual machine requests a swap in with respect to the GFN, the VSWAP search the PSN corresponding to the GFB from the second table 904, and reads information from the searched PSN.

The foregoing method for managing a memory according to embodiments of the present invention may be implemented in an executable program command form by various computer means and be recorded in a computer readable recording medium. Such a computer readable recording medium may include a program command, a data file, and a data structure individually or a combination thereof. A program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as a Compact Disc Read Only Memory (CD-ROM) or a Digital Versatile Disc (DVD), Magneto-Optical Media such as floptical disk, and a hardware device such as ROM, RAM, and flash memory for storing and executing program commands. The program command also includes a machine language code created by a complier and a high-level language code executable by a computer using an interpreter. The foregoing hardware device may be configured to be operated in conjunction with at least one software module to perform operations according to embodiments of the present invention.

As mentioned above, in a method and portable terminal for managing the memory according to embodiments of the present invention, the memory is dynamically allocated so that the performance of a system can be improved.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method of managing a memory in a portable terminal including a main memory, a secondary memory, and a plurality virtual machines allocated by partitioning the main memory, the method comprising:
   generating, by the virtual machines, monitoring information by monitoring access to the main memory and the secondary memory and swapping out with respect to the secondary memory, wherein access is an operation of reading out information from the main memory and the secondary memory and swapping out is an operation of writing an application or data in the secondary memory;
   determining memory allocation amounts for each of the virtual machines by using the monitoring information; and
   allocating the main memory to the virtual machines in a partitioning scheme based on the determined memory allocation amounts.

2. The method of claim 1, wherein determining the memory allocation amounts for each of the virtual machines comprises:
   calculating page miss rates according to a ratio of respective pre-set memory allocation amounts to respective amounts of the main memory necessary for each of the virtual machines; and
   determining the memory allocation amounts of the virtual machines based on the calculated page miss rates.

3. The method of claim 2, wherein determining the memory allocation amounts of the virtual machines comprises preferentially allocating, when an additional memory amount is allocated to the virtual machines, the same additional memory amount to a virtual machine having a greatest reduction in the page miss rate among the virtual machines.

4. The method of claim 1, wherein determining the memory allocation amounts of the virtual machines comprises determining the memory allocation amounts of the virtual machines in consideration of a preset importance of each of the virtual machines.

5. The method of claim 1, wherein monitoring access to the main memory and the secondary memory comprises refraining from monitoring access of hot pages corresponding to a hot list while monitoring access of warm pages corresponding to a warm list and access of cold pages corresponding to a cold list, and wherein the hot list, the warm list, the cold list are classified according to an access order of pages.

6. The method of claim 5, further comprising:

moving, when access of a page corresponding to the warm list or the cold list is monitored, an accessed page to the hot list;

moving a latest accessed page from the hot list to the warm list; and moving a latest accessed page from the warm list to the cold list.

7. The method of claim 6, further comprising swapping out information of a removed page when a page is removed from the cold list.

8. The method of claim 5, further comprising periodically changing a size of the hot list.

9. A portable terminal, comprising:

a secondary memory;

a main memory for storing virtual machines and a virtual machine monitor loaded from the secondary memory; and a controller for accessing the main memory to interpret commands of the virtual machines and the virtual machine monitor, and executing a function according to a result of the interpretation, wherein the virtual machine monitor generates monitoring information by monitoring access to the main memory and the secondary memory and swapping out with respect the secondary memory by the virtual machines, determines memory allocation amounts for each of the virtual machines using the monitoring information, and partitions the main memory to the virtual machines based on the determined memory allocation amounts, wherein access is an operation of reading out information from the main memory and the secondary memory and swapping out is an operation of writing an application or data in the secondary memory.

10. The portable terminal of claim 9, wherein the virtual machine monitor calculates page miss rates according to a ratio of the respective pre-set memory allocation amounts to respective amounts of the main memory necessary for each of the virtual machines, and determines the memory allocation amounts of the virtual machines based on the calculated page miss rates.

11. The portable terminal of claim 10, wherein the virtual machine monitor preferentially allocates, when an additional memory amount is allocated to the virtual machines, the same additional memory amount to a virtual machine having a greatest reduction in the page miss rate among the virtual machines.

12. The portable terminal of claim 9, wherein the virtual machine monitor determines the memory allocation amounts of the virtual machines in consideration of a preset importance of each of the virtual machines.

13. The portable terminal of claim 9, wherein the virtual machine monitor does not monitor access of hot pages corresponding to a hot list but monitors access of warm pages corresponding to a warm list and access of cold pages corresponding to a cold list, and wherein the hot list, the warm list, the cold list are classified according to an access order of pages.

14. The portable terminal of claim 13, wherein the virtual machine monitor moves an accessed page to the hot list, moves a latest accessed page from the hot list to the warm list, and moves a latest accessed page from the warm list to the cold list when access of a page corresponding to the warm list or the cold list is monitored.

15. The portable terminal of claim 14, wherein the virtual machine monitor swaps out information of a removed page when a page is removed from the cold list.

16. The portable terminal of claim 13, wherein the virtual machine monitor periodically changes a size of the hot list.

17. The portable terminal of claim 9, wherein the main memory further comprises a virtual swap unit controlling swapping of the virtual machines and swapping of the virtual machine monitor, and wherein the controller executes a function of the virtual swap unit.

* * * * *